United States Patent Office 3,281,942
Patented Nov. 1, 1966

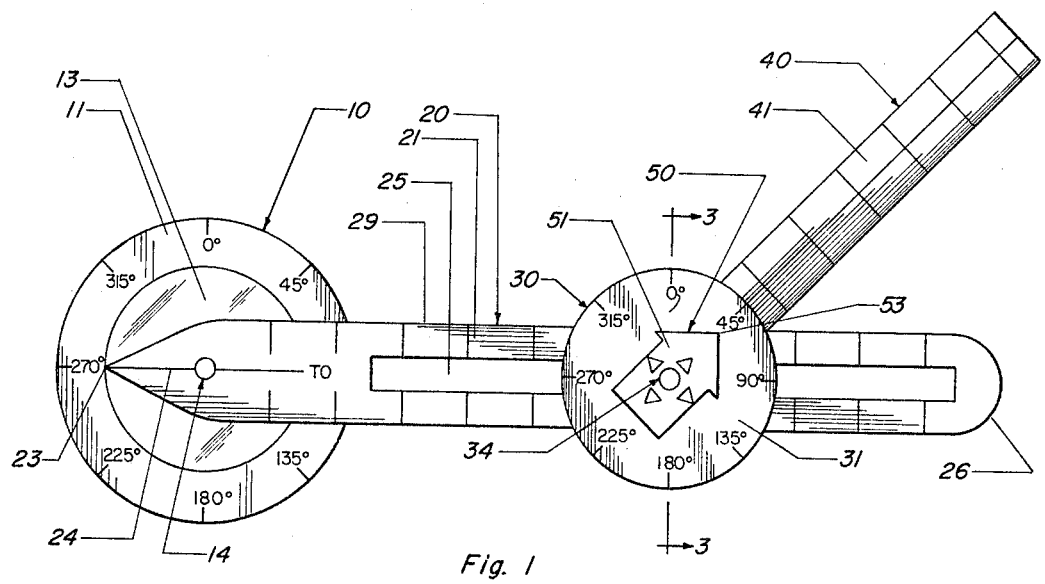

3,281,942
NAVIGATIONAL COURSE FINDER
William E. Preuit, 1014 N. Custer, Grand Island, Nebr.
Filed Oct. 4, 1965, Ser. No. 492,483
2 Claims. (Cl. 33—98)

This invention relates to navigational instruments for mariners and aviators and particularly relates to a navigational course finder by which the mariner or aviator may ascertain his position on a cartographic chart.

It is an object of the present invention to provide a navigational device which may be utilized in conjunction with a cartographic chart, e.g. a map, to apprise the mariner or aviator of one or more of his loci of position with respect to a given location on the cartographic chart.

It is another object of the present invention to provide a means for indicating to the mariner or aviator the direction and distance between cartographic locations, both for direct line and bent "dog-leg" courses.

It is another object of the present invention to provide a navigational instrument that is adaptable for vector analysis problems.

It is a further object of the present invention to provide a navigational device that is readily adaptable for use both in the cramped quarters of small aircraft or boats and in the roomier conditions of airport control towers.

It is a further object of the present invention to provide a "homing" course for the pilot based upon a radio signal.

It is another object to provide a means for a pilot to determine his approximate position based upon but one directional radio reading.

It is another object of the present invention to provide means by which the pilot may quickly determine his cartographic location with a high degree of accuracy based upon directional radio readings eminating from two radio transmitter locations.

A still further object of the present invention is to provide a navigational device, which is simple and durable in construction, is simple in its structure and operation so that the device can be readily used by a novice without requiring extensive training in mathematics, whereby even the student pilot will be able to operate it, and susceptible of ready manipulation of a user simultaneously directing or operating an aircraft in flight.

It is yet another object of the present invention to provide a navigational course finder that will compensate for and eliminate the more common navigational errors that are prevalent among novice aviators and mariners.

With the foregoing and other objects in view, which will be pointed out as the description proceeds, the invention consists in the novel construction, arrangement, and combination of elements hereinafter set forth, and particularly pointed out in the appended claims, and illustrated by the accompanying drawing.

In the drawing, wherein like numbers refer to like parts in the several views, and in which:

FIGURE 1 is a top plan view of the navigational course finder of the present invention.

FIGURE 2 is a front elevational view of the navigational course finder of the present invention.

FIGURE 3 is a sectional elevational view taken along line 3—3 of FIGURE 2.

FIGURE 4 is a sectional elevational view similar to that of FIGURE 3 showing a rivet type fastener means.

The navigational course finder device of the present invention comprises a primary compass rose 10, a primary elongate arm 20, a secondary compass rose 30, a secondary elongate arm 40, and a revolvable indicator 50.

Primary compass rose 10 is a plate-like structure, normally taking the form of a horizontal circular disc having a pair of opposed planar surfaces including an upper surface 11 and a lower surface 12. There is a central reference point on primary compass rose 10, herein indicated as 14. Imprinted upon, or otherwise viewable from upper surface 11, are graduated angular indicia surrounding central reference point 14. With the more common disc-type compass roses, the full 360° surrounding the central reference point is graduated to 1 or 2 degree increments at the circular periphery; however, for purposes of clarity, the angular increments are shown as 45° (degrees) in the drawing. There is a central portion 13 of compass rose 10 that is visually vertically transparent between planar surfaces 11 and 12, said transparent portion 13 substantially surrounding and extending adjacently to the geometric center, e.g. 14, of circular disc compass rose 10.

Primary arm 20 comprises an elongate horizontal bar 29 having a pair of opposed surfaces including a planar upper surface 21 and a planar lower surface 22, and a slidable lug 28. Primary arm 20 is horizontally superimposed over primary compass rose 10, and the two elements 20 and 10 are pivotably joined together as with primary vertical pin 14 having a headed first end 15, a shank portion 16, a lower holding washer 19, and a convergent point second end 17. Pointed second end 17 serves as an anchor means of the lower central reference point, herein as the geometric center of lower central primary compass rose 10. A tiny suction cup could also be used as an anchor means. Shank 16 passes through surfaces 11 and 12 at the geometric center of circular disc 10 and through surfaces 21 and 22 at the longitudinal central axis of primary bar 29. Primary compass rose 10 and primary bar 29 are so positioned or spaced along shank 16 that the upper surface 11 on primary rose 10 lightly abuts the lower surface 22 of bar 20 so that the abutting surfaces are frictionally engaged as primary rose 10 is manually revolved about pin 14; the frictional engagement provides a stop means to fix the rotational relationship between primary compass rose 10 and arm 20.

The first end 23 of primary arm 20 extends beyond central portion 13 and terminates adjacent to the peripheral angular indicia. First end 23 includes an integral pointer means, which lies along the longitudinal central axis of bar 29, and which is used to indicate the angular relationship of primary arm 20 with respect to primary compass rose 10. The elongate arm integral pointer means may comprise a pointed first end 23 or as a fine longitudinal line 24 imprinted upon bar upper surface 21. The upper surface 21 may be imprinted with the directional legend TO.

Primary elongate arm 20 is visually transparent along its longitudinal central axis between surfaces 21 and 22. This visual transparency can be provided through the use of a transparent structural material, e.g. Plexiglas, for bar 29, or preferably the bar 29 may have a longitudinal central slot 25 extending from primary compass rose 10 toward primary arm second end 26. Primary arm 20 has a graduated cartographic distance scale, increasing in value from central pin 14 toward second end 26. These distance scales may conveniently take the form of transverse marking on primary bar 29 at the elongate edges thereof.

Thus, the transverse markings on primary arm 20 indicate the cartographic distance from central pin 14. As can best be seen in FIGURES 2 and 3, primary arm 20 includes a rectangular lug 28 disposed within slot 25 and slidably journalled by elongate bar 29.

There is a secondary compass rose 30, which is also of a horizontal circular disc configuration having a pair of opposed surfaces including a planar upper surface 31 and a planar lower surface 32. There is a central reference point on secondary compass rose 30, herein indicated as secondary vertical pin 34. Imprinted upon, or otherwise viewable from upper surface 31, are graduated angular indicia surrounding central reference point, e.g. 34. Secondary compass rose 30 is smaller, both in diameter and in thickness, than is primary compass rose 10.

Secondary arm 40 is a horizontal elongate bar having a pair of opposed surfaces including a planar upper surface 41 and a planar lower surface 42. Secondary arm 40 is preferably formed of a transparent material, e.g. Plexiglas, so that it is visually transparent, at least along the longitudinal central axis. There is a graduated cartographic distance scale transversely marked across secondary arm 40, said markings indicating the cartographic distance from secondary central pin 34. There is a pivotal indicator 50 having a pair of opposed surfaces including a planar upper surface 51 and a planar lower surface 52. Pivotal indicator 50 has a pointer 53, herein as the nose of an airplane, that terminates adjacent to the angular indicia of secondary compass rose 30. The upper surface 51 of indicator 50 is provided with a four pointed star to indicate 90° increments with respect to pointer 53.

Elements 30, 40, and 50 are pivotably and slidably connected with primary arm 20 with secondary vertical pin 34 passing through pivotal indicator 50, the geometrical center of secondary compass rose 30, lug 28 at the longitudinal central axis of primary arm 20, and the longitudinal central axis of secondary arm 40 nearer to its first end 43. Secondary vertical pin 34 is in all respects identical to primary vertical pin 14 having a headed first end 35, a shank 36, and a lower holding washer 39. Thus, each of elements 30, 40, and 50 is independently revolvable about shank 36 of secondary pin 34, and these elements 30, 40, 50, and 34, slidably attach lug 28 to primary bar 29. An obvious slidable equivalent would result if a lug were slidably attached to the exterior elongate edges of bar 29, in "slide-rule" fashion.

Moreover, elements 30, 40, and 50 are so positioned along secondary pin 34 that adjacent surfaces of the elements are in frictional engagement to provide a stop or fix means between the various elements. Specifically, sceondary arm upper surface 41 is frictionally engaged with the primary elongate arm 20, herein as bar lower surface 22; the upper surface of primary arm 20, herein as bar upper surface 21, is frictionally engaged with secondary compass rose lower surface 32; the secondary compass rose upper surface 31 is frictionally engaged with pivotal indicator lower surface 52 and the pivotal indicator upper surface 51 is frictionally engaged with the head 35 of secondary vertical pin 34.

An alternate means for attaching elements 20, 30, 40, and 50 together is the rivet 74 shown in FIGURE 4. Rivet 74 has an upper head 77, a shank 76, and a lower head 78. There is an elongate central vertical hole 79 so that the navigational instrument may be removably mounted onto a wall map with a pin or screw anchor means (not shown). Obviously, rivet 74 could also be employed for attaching elements 10 and 20, rather than fastener 14.

For ease of operation, the primary elongate bar 20 should be manually flexible; the distance between either anchor points 17 and 37 and the navigation course finder, e.g. lower surfaces 12 and 42 respectively, should not exceed about ¼ inch; and the aggregate thickness of transparent central portion 13 and bar first end 23 should not exceed the aggregate thickness of secondary arm 40 and primary arm 20.

While the navigation course finder of the present invention can be employed with all types of cartographic charts, it is especially well adapted to the "Sectional Aeronautical Charts" that are published and printed by the United States Coast and Geodetic Survey Office of the United States Department of Commerce. These "Sectional Aeronautical Charts," having a scale of 1:500,000, commonly utilized by both pilots and airport control tower personnel. On the "Sectional Aeronautical Chart" all airports are indicated by a legend, and those airports having "Very High Frequency Omni-Directional Radio Range," i.e. VOR, are indicated with an imprinted compass rose. Surrounding the airport, the chart's imprinted compass rose being aligned with magnetic north.

The navigational course finder of the present invention is a highly versatile instrument as will become readily apparent from those operations described in the following paragraphs.

*Homing operation*

If the pilot is lost or unsure of his location, and can pick up only one VOR station, the pilot places central reference point 15 of the primary compass rose 10 over the cartographic chart location of the VOR station that he is receiving. This can be readily accomplished because of central transparent portion 13 of primary compass rose 10. Next, primary compass rose 10 is directionally lined with respect to the chart's VOR station compass rose, e.g. the north of each in alignment, and the primary compass rose is anchored to the chart's VOR station with its lower anchoring means, e.g. pin point 17. Thus, the primary compass rose has been aligned with the chart's VOR station.

Next, the pilot manipulates his radio's omni-bearing selector until he receives a TO directional reading from the VOR station. Then, he rotates primary arm 20 until the pointer 24 is aligned with this same reading on primary compass rose 19. Thus, the pilot knows that his location is somewhere along the line indicated by the longitudinal central axis, e.g. slot 25, of primary arm 20. The pilot directionally aligns the secondary compass rose 30 with magnetic north. The pilot knows his direction of travel from the aircraft's compass, and revolves pivotal indicator 50 with respect to secondary compass rose 30 until forward point 53 indicates his line of flight. Thus, the pilot can tell from pivotal indicator 50 and secondary compass rose 30 just how far and in what direction to turn his aircraft so as to "home in" on the VOR airport.

*Approximate location operation*

If the pilot is in no immediate danger, and does not care to home in on the VOR station until he knows the exact distance therefrom, he rotates secondary arm 40 until it is at a 90° angle with respect to primary arm 20. Then, he changes his flight path in accordance with the direction of secondary arm 40, noting the change with pivotal indicator 50 on secondary compass rose 30. The new flight path is continued until his VOR reading changes by 10° (degrees). Thus, by knowing the time involved for the second VOR reading, the pilot may quickly empirically calculate his distance from the VOR station.

*Exact location operation*

If the pilot is lost or unsure of his location, and can pick up at least two different VOR stations, he can ascertain his exact location within a very short time. As with the previously described homing operation, the pilot aligns primary compass rose 10 with the first VOR station, and gets a TO reading and indicates this on primary compass rose 10 with pointer 24 of primary arm 20. Next, the pilot aligns secondary compass rose 30 with magnetic north. Then, if extremely high accuracy is desired, the pilot turns the aircraft toward the first VOR station, noting this change with point 53 of pivotal indicator 50. Then, the pilot takes a TO reading from a second VOR station and aligns secondary arm 40 with respect to secondary compass rose 30 to point in the angular direction of the second VOR station; this step invariably requires sliding of lug 28 along slot 29. The intersection of primary arm 20 with secondary arm 40, e.g. secondary pin 34, shows the pilot's true location on the chart, and his position is indicated. The exact mileage from the respective VOR stations is indicated by the scale markings on arms 20 and 40.

Since the pilot now knows his exact location, he may then fly in to any airport in the vicinity. To get his bearing to the desired airport, he rotates arm 40 to intercept that airport, and the appropriate heading thereto is indicated on compass rose 30 (which has been aligned north). The forward point 53 of pivotal indicator is aligned with the longitudinal central axis of arm 40, to graphically indicate the appropriate directional heading for the chosen airport.

While but three operational uses have been described, all the component steps shown may each be independently utilized as is well known in the art. For example, one may plot his course from one point to another; utilizing secondary arm 40, dogleg courses may be plotted; distances to alternate VOR stations may be plotted; and vector analysis problem may be plotted with one arm indicating air speed, and the other arm indicating aircraft speed.

While the operation has been illustrated in terms of the pilot's manipulation of the course finder instrument, it is obvious that the instrument can be equally utilized by the VOR personnel. Preferably, both parties, the pilot and the VOR personnel, should be equipped with the navigational course finder of the present invention. Also small water craft utilizing directional navigational signals along coastal waters may use the navigational device in analogous fashion.

The concept of the present invention is to specifically include a circular slide rule computer incorporated within the primary compass rose, said optional computer feature being conveniently employed to solve simple logarithmic mathematical problems.

From the foregoing, the construction and operation of the navigational course finder device will be readily understood and further explanation is believed to be unnecessary. However, since numerous modifications and changes will readily occur to those skilled in the art, it is not desired to limit the invention to the exact construction shown and described, and accordingly, all suitable modifictions and equivalents may be resorted to, falling within the scope of the appended claims.

I claim:

1. A navigational course finder device comprising:
(A) A horizontal plate-like primary compass rose, a central portion of the primary compass rose between the central reference point and the peripheral angular indicia being visually transparent, the lower surface of the primary compass rose having an anchor means at the central reference point,
(B) A primary elongate arm horizontally superimposed upon the primary compass rose, said primary elongate arm comprising an elongate bar and a lug slidably attached along the longitudinal central axis thereof, said primary arm being pivotably attached to the central reference point of the primary compass rose, said pivotal connection being nearer to the primary arm first end, the primary arm first end being integrally provided with a pointer means that extends functionally adjacent to the peripheral angular indicia of the primary compass rose, said primary elongate arm at least along the central longitudinal axis being vertically visually transparent, said primary elongate arm having a graduated cartographic distance scale markings extending toward the primary arm second end,
(C) A horizontal plate-like secondary compass rose, the central reference point of said secondary compass rose being pivotably and revolvably attached to the slidable lug,
(D) A pivotal indicator located above the secondary compass rose, said pivoted indicator having a substantially planar lower surface that is frictionally engaged with the upper surface of the secondary compass rose, and
(E) A vertically visually transparent secondary elongate arm that is revolvably pivotably connected to the geometric center of the secondary compass rose, the secondary arm being disposed below the secondary compass rose, said secondary elongate bar arm having a graduated cartographic distance scale along the longitudinal length thereof, the longitudinal central axis of the secondary elongate bar being visually marked, said secondary arm having a substantially planar lower surface.

2. A navigational course finder device comprising:
(A) A horizontal circular disc primary compass rose having planar upper and lower surfaces adapted to lie substantially parallel upon a cartographic chart, said compass rose having a vertical primary pin intersecting the geometric center of the compass rose, the lower portion of said vertical central pin being of a convergent configuration to provide a lower anchor means, a central portion of the compass rose between the vertical pirmary pin and the peripheral angular indicia being visually transparent,
(B) A primary elongate flexible arm having planar upper and lower surfaces superimposed upon the primary compass rose, said elongate arm being rotatably and pivotably attached to the primary compass rose with said vertical central primary pin, said vertical central pin passing through the primary elongate arm nearer to the first end thereof, the primary arm first end extending beyond the primary compass rose transparent central portion so as to be adjacent to the peripheral angular indicia thereof, the primary arm first end being integrally provided with a pointer means, said primary elongate arm having a graduated cartographic distance scale commencing at the vertical central primary pin and extending toward the primary arm second end, the graduate scale length of the primary arm having a longitudinal central slot, said primary arm including a lug slidably disposed along the primary arm longitudinal slot,
(C) A secondary compass rose of disk-like shape and having a planar bottom surface that is frictionally engaged with the primary arm upper surface, said secondary compass rose being pivotably and revolvably attached to the slidable lug by means of a secondary vertical pin intersecting the geometric center of the secondary compass rose and the slidable lug, said secondary pin extending upwardly from said secondary compass rose and extending downwardly from the slidable lug,
(D) A pivotal indicator having a planar lower surface that is frictionally engaged with the secondary compass rose upper surface, said pivotal indicator being pivotably engaged by the upward extension of the secondary pin, and
(E) A visually transparent secondary elongate arm having planar upper and lower surfaces, the upper surface thereof abutting the lower surface of the primary elongate arm, the lower extension of the secondary vertical pin passing through the secondary elongate arm adjacent to the first end thereof so that the secondary elongate arm is pivotably and revolvably engaged with the slidable lug, said secondary elongate arm having a graduated cartographic distance scale markings along the longitudinal length thereof, the longitudinal central axis of the secondary elongate bar being visually marked, the vertical thickness of the secondary elongate arm being substantially equal to the thickness of the primary compass rose transparent central portion.

References Cited by the Examiner

UNITED STATES PATENTS

| | | | |
|---|---|---|---|
| 982,793 | 1/1911 | Burrage | 33—98 |
| 1,108,517 | 8/1914 | Potter | 33—75 |
| 1,393,533 | 10/1921 | Hoyt | 33—116 |
| 2,238,190 | 4/1941 | Sawtelle | 33—98 |
| 2,641,843 | 6/1953 | Hart et al. | 33—75 |
| 3,116,558 | 1/1964 | Dimo | 33—76 |

FOREIGN PATENTS 111,949  9/1944  Sweden.

LEONARD FORMAN, *Primary Examiner.*

H. N. HAROIAN, *Assistant Examiner.*